ORDER CONTROL ARRRANGEMENTS FOR ELECTRONIC DIGITAL COMPUTERS

Filed Jan. 23, 1956 6 Sheets-Sheet 1

INVENTORS
CHRISTOPHER STRACHEY
DONALD B. GILLIES
By:
Stevens, Davis, Miller & Mosher
Attorneys Jan. 16, 1962 C. STRACHEY ET AL 3,017,094

ORDER CONTROL ARRRANGEMENTS FOR ELECTRONIC DIGITAL COMPUTERS

Filed Jan. 23, 1956 6 Sheets-Sheet 2

INVENTORS:
CHRISTOPHER STRACHEY
DONALD B. GILLIES
By: Stevens, Davis, Miller & Mosher
Attorneys

INVENTORS:
C. STRACHEY
D. B. GILLIES

Jan. 16, 1962 C. STRACHEY ET AL 3,017,094

ORDER CONTROL ARRRANGEMENTS FOR ELECTRONIC DIGITAL COMPUTERS

Filed Jan. 23, 1956 6 Sheets-Sheet 4

INVENTORS:
CHRISTOPHER STRACHEY
DONALD B. GILLIES
By: Stevens, Davis, Miller & Mosher
Attorneys

ORDER CONTROL ARRRANGEMENTS FOR ELECTRONIC DIGITAL COMPUTERS

Filed Jan. 23, 1956

6 Sheets-Sheet 6

INVENTORS:
CHRISTOPHER STRACHEY
DONALD B. GILLIES

By: Stevens, Davis, Miller & Mosher

Attorneys

United States Patent Office 3,017,094
Patented Jan. 16, 1962

3,017,094

ORDER CONTROL ARRANGEMENTS FOR ELECTRONIC DIGITAL COMPUTERS

Christopher Strachey, London, England, and Donald Bruce Gillies, Toronto, Ontario, Canada, assignors, by mesne assignments, to International Business Machines Corporation, New York, N.Y., a corporation of New York Filed Jan. 23, 1956, Ser. No. 560,831
Claims priority, application Great Britain Jan. 24, 1955
11 Claims. (Cl. 235—157)

This invention relates to electronic digital computers and is more particularly, although not exclusively, concerned with binary code machines which operate wholly or mainly in the serial mode with both number and order words in the form of electronic pulse signal trains.

The so-called accumulator or computing organ of most computing machines already known comprises one, or at the most two storage registers uniquely associated with a computing unit, frequently termed the mill, for performing arithmetic and logical operations using operand-representing signals available within the machine. With such arrangements the result of any arithmetic or logical operation becomes registered in such unique accumulator storage register or registers and, if not immediately required in a succeeding operation involving use of the accumulator, such result must be transferred to some other storage location, such as one in the main data store, before the accumulator can again be brought into use in relation to other operand-representing signals. Furthermore, the majority of operations involving the use of the accumulator are concerned with the performance of some arithmetic or logical operation with a first operand-representing signal which has previously been transferred to the aforesaid accumulator storage register and a second operand-representing signal which is supplied to such computing unit for performing the required arithmetic or logical operation concurrently with the reading out of the first operand-representing signal from the accumulator storage register. A number of transfer operations, each involving a separate machine operation cycle and an individual programme order, are thus rendered necessary in addition to the particular order controlling the actual performance of the required arithmetic or logical operation.

An object of the present invention is to provide an improved arrangement of apparatus for performing the function of the so-called accumulator and whereby the overall speed of operation of the machine and its flexibility in use and its ease of programming may be substantially increased.

According to one aspect of the invention, an electronic digital computer arranged for operation in the serial mode and provided with a control system by which the machine operation is determined in accordance with an order comprising two separate address-defining digit groups, comprises a computing unit having at least two inputs and an output, a plurality of single word storage registers each of the immediate access type, first switching means controlled by the configuration of one of said groups of address-defining digits of the order to connect any one of said register outputs to one of said computing unit inputs, second switching means controlled by the configuration of a different one of said groups of address-defining digits of said order to connect any one of said register outputs to another of said computing unit inputs, means for causing simultaneous transmission of the contents of each of said connected registers to said computing unit inputs and third switching means controlled by either one of said groups of address-defining digits of said order for connecting the output from said computing unit to the input of one or the other of the two of said registers defined by said digit groups.

According to another aspect of this invention, an electronic digital computer comprises a computing store having a plurality of separate storage registers, each of an immediate access kind, computing apparatus and control means for routing information from parts of said computing store through said computing apparatus and back to said computing store and wherein the storage registers of said computing store are organised in groups, all of the storage registers of one particular group being arranged to be capable of performing the function of an accumulator register and wherein said control means is adapted to effect selection of any required one of said particular group of registers for operation as an accumulator register.

In order that the nature of the invention may be more readily understood one particular embodiment thereof will now be described with reference to the accompanying drawings, in which:

FIG. 1 is a block schematic diagram of those elements of the machine which are principally concerned with the present invention.

FIG. 2 compriess a chart diagram showing the word formations used in the machine.

FIG. 6 is a similar more detailed block schematic diagram of the arrangements of the high speed computing store, while

FIGS. 4, 6 and 7 are drawn whereby they may be arranged with common leads in contiguous relationship to form a single composite diagram.

GENERAL ARRANGEMENT OF MACHINE

Figure 1:
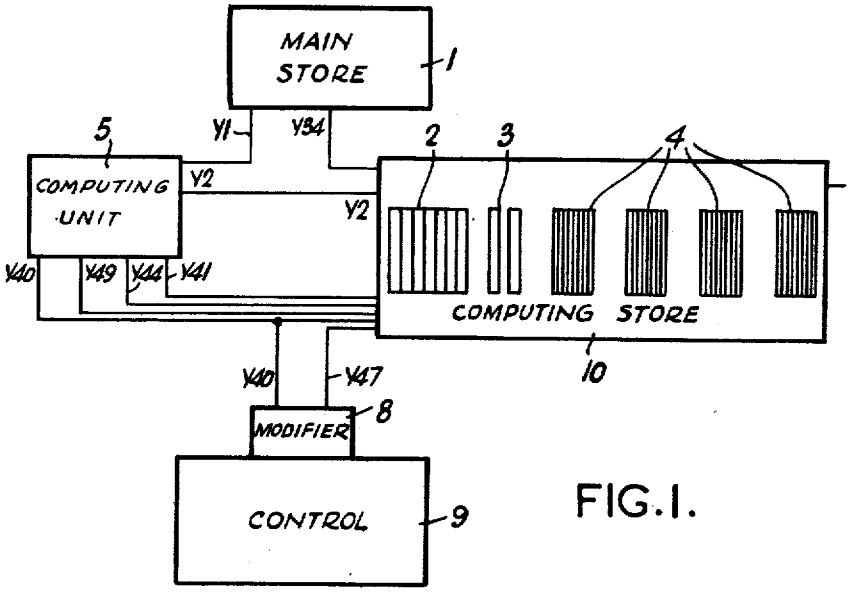

Referring first to the block schematic diagram of FIG. 1 the general organisation of the machine is one which comprises a main or low access-speed store 1, a high speed computing store 10 consisting of a group of accumulator registers 2, a number of, e.g. four, groups of further high-speed registers 4 and also a group 3 of further addresses which are equivalent to registers but which are actually sources of or destinations for signals such as constant-representing signals, connections to input or output apparatus and the like.

The machine also includes a computing unit or mill 5 comprising a multi-purpose computing circuit and a control system 9, the signal entry to which is by way of a modifier 8.

Signals are applied from the main store 1 to an input of the computing store over input bus bar Y34 while signals from the output of the computing unit 5 to another input of such computing store are fed over input bus bar Y2. Operand-representing signals from the computing store 10 can be fed over any one or more of the bus bars Y40, Y41, Y44 and Y49 while signals from such computing store can also be fed into the control 9 through modifier 8 over a branch of bus bar Y40 and over a further bus bar Y47.

It is to be noted that the rectangle defining the control system 9 must be regarded as symbolic only since the various elements thereof, which control the machine rhythm and the routing of signals between the various parts of the machine through gate and like devices, are necessarily located in suitable positions throughout the machine and not grouped together as is suggested by such symbol.

Broadly the machine operates with a regular rhythm consisting of a so-called A period when one, the A, order of an order pair contained in each order word is obeyed followed by a so-called B period when the other, the B, order of the order pair is similarly obeyed and a subsequent C period when the next order word is selected and fed into the control system. In both the A and B periods the order, A or B, which has previously been read as part of an order word out of one of the high-speed register groups 4 into the control system 9, is obeyed by the simultaneous selection of one of the accumulator registers in group 2 and one of the high-speed registers 4 in one of the groups or one of the sources 3 or any other one of the accumulator registers 2 for use as the registers to be associated with the computing unit 5. Signals from the selected addresses are then fed simultaneously to the computing unit 5 over two of the bus bars Y40, Y41, Y44 and Y49. After the lapse of one beat period during which the necessary computing operation is carried out with such operand-representing signals within the computing unit 5, the output of the latter is fed back to the computing store 10 over bus bar Y2 for insertion into the chosen register therein.

MACHINE RHYTHM

The machine operates with number and order word signals transmitted in serial form as electric pulse signal trains in which binary value "1" is denoted by a positive-going (approximately 13 v.) pulse within any given digit interval, and in which binary value "0" is indicated by the absence of such a pulse and a sustained potential of earth or below. Each minor cycle or beat for signalling a word is of 42 digit intervals length as indicated at 0, 1, 2 . . . 41 in FIG. 2*a*, each digit interval being of 3 microseconds duration. Each word interval or beat is thus 126 microseconds long.

Figure 2:
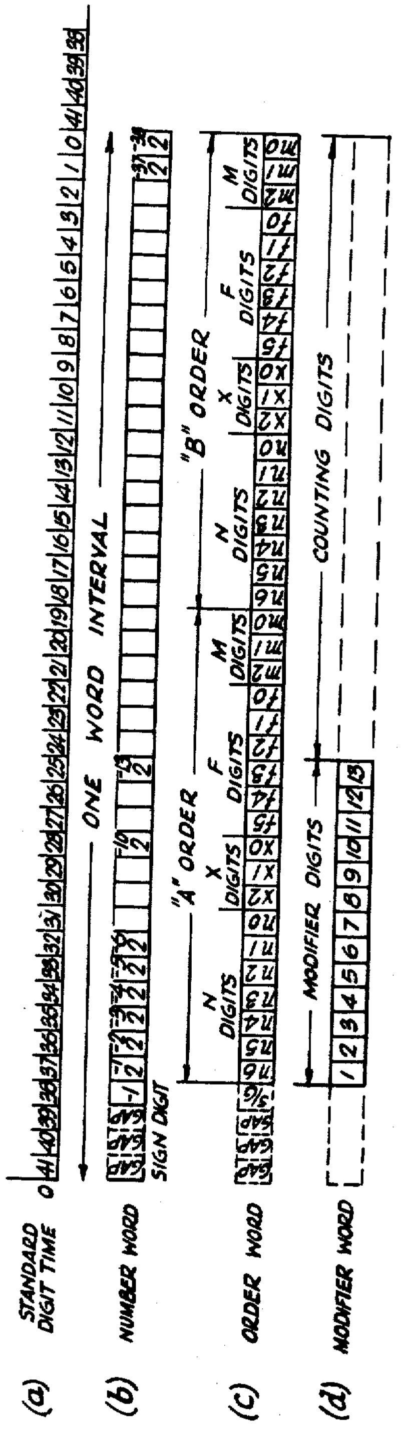

Number words contain 39 significant digits signalled in ascending power order during the first 39 digit intervals of each beat. The remaining 3 digit intervals at the most significant end of the number word constitute gap digits separating one word from the next. These are normally of value "0" and inoperative but may, on occasion, accommodate digit values caused by extension of a number for certain specific purposes. The form of a number word is illustrated in FIG. 2*b* from which it will be seen that the least significant or first occurring digit in digit interval 0 (standard machine time) is assumed to have binary value $2^{-38}$ whereas the most significant digit occurring in digit interval 38 (standard machine time) constitutes a sign digit of value $-1$. The next to most-significant digit lying immediately before the sign digit in digit interval 37 is of value $2^{-1}$, i.e. of value ½.

Each order word, shown in FIG. 2*c*, comprises 39 successive digits also but contains two separate orders known as the A and B orders respectively. Each order is of 19 digits length, the B order being accommodated in the first 19 digit intervals, 0 . . . 18, of the standard machine time and the second or A order in the next 19 digit intervals, 19 . . . 37. The remaining digit in digit interval 38 constitutes what is known as a "stop-go" digit. If this digit is of binary value "1" it means there will be no stoppage of the machine operation before obeying either of the orders contained in the order word but if it is of binary value "0" it provides a facility for an optional stop before obeying the first or A order of an order word. The remaining digit intervals 39, 40 and 41 are normally blank and constitute gap-digits for separating one word from the next. On occasion, however, they may be used to accommodate an extension of the A order.

Each of the A and B orders has a similar form and contains, in time order commencing from the initial or lowest significant end, 3 so-called M digits $m0$, $m1$, $m2$, followed by 6 so-called F digits $f0$, $f1$, $f2$, $f3$, $f4$, $f5$. These are followed by 3 so-called X digits $x0$, $x1$, $x2$ and the order is completed by a group of 7 so-called N digits $n0$, $n1$, $n2$, $n3$, $n4$, $n5$, $n6$.

The M digits define the address, in the group of accumulator registers 2 of the high-speed computing store 10 of any required modifier word to be used for altering either the subsequent N digits only or both the N and X digits of the same order. It is also possible to alter the X digits only by the modifier word. The F digits define the particular function which is to be performed by the machine in execution of the order. The X digits define, inter alia, the particular register in the first block 2 of accumulator registers which is to be used as an accumulator register associated with the computing unit while the N digits define, inter alia, the address in the storage system where one operand is to be obtained or delivered.

Each normal operation cycle of the machine comprises an A period during which the A order is dealt with, followed by a B period during which the B order is dealt with, followed by a C period during which the next order word is selected and fed into the control system. Each of the A and B periods has a minimum length of two beats consisting of a first or D beat and a final or E beat. There may, however, be other intervening beat periods between such D and E beats dependent upon the type of operation which is being performed.

In many respects the machine to be described resembles that referred to in copending application Ser. No. 418,104 of Andrew St. Johnson, filed March 23, 1954, now Patent No. 2,895,671 to which cross-reference will hereinafter be made as "copending application A."

As in the machine described in such copending application A, the present machine includes a source of "clock" pulses occurring one in each digit interval and consisting of a positive-going pulse lasting for the major part, e.g. approximately 2 microseconds, of each digit interval. The arrangements for providing these "clock" pulses and also for providing a related series of "reset" pulses which each consist of a sharp negative-going pulse coincident with the trailing edge of each "clock" pulse, resemble those of the pulse generators PGA shown in FIG. 11A of the aforesaid copending application A and wherein a separate recording track on a magnetic drum store forming the main store 1 provides a continuous sine wave output which is fed through an amplifier to a pulse squaring circuit, the square pulse output of which provides, after further amplification, the aforesaid "clock" pulses. The same square wave output from the pulse squaring circuit is applied to a pulse generating circuit including a differentiating circuit followed by an over-biased amplifier to select each negative-going edge of the aforesaid square pulse waveform. The resultant negative-going spike waveform is used, after further amplification, as the aforesaid "reset" pulse waveform.

Before commencing a more detailed description of the machine illustrated in the drawings, a brief reference will be made to the form of the various block schematic symbols used in such drawings.

Figure 6:
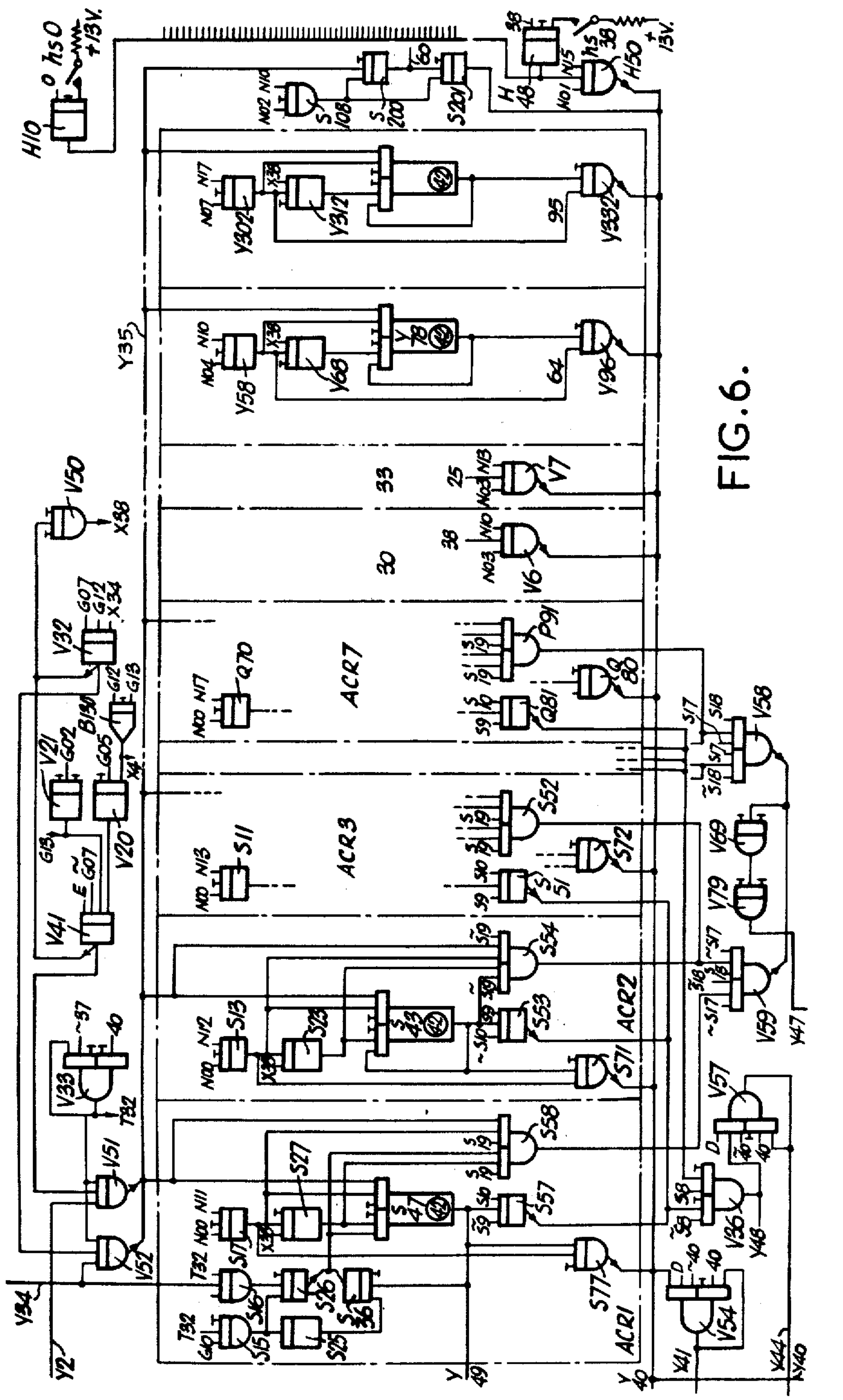

The symbol used, for example at S26 in FIG. 6, denotes a multiple input "AND" type gate circuit, such as is shown in detail in FIG. 4B of the aforesaid copending patent application A and serves to provide a positive-going output on its output leads only upon coincidence of positive-going inputs on each of its used input leads. For brevity such a device will hereinafter be referred to as a "gate."

The symbol used, for example at S15 in FIG. 6, denotes a gate followed by a delay device imposing a time delay of 1 digit interval of the machine rhythm and provides a correspondingly delayed positive-going output on its output leads only when each of the input leads to the gate which are in use are supplied with simultaneous positive-going inputs. A circuit arrangement of such a device is shown by the combination of FIG. 4B and FIG. 2B of the aforesaid copending patent application A. For brevity such a device will hereinafter be referred to as a "unit delay."

The symbol shown, for example at S58 in FIG. 6, denotes a unit delay preceded by two alternatively operable multiple input "AND" gate circuits and provides a positive-going output and its output leads only when simultaneous positive-going inputs are applied to the used input leads of either one of the gate circuits. A circuit arrangement for such a device is shown in detail in FIG. 3B of the aforesaid copending patent application A. For brevity such a device will hereinafter be referred to as a "double-entry gated relay."

The symbol used, for example at S25 in FIG. 6, denotes a multiple input "AND" gate circuit followed by an inverter circuit and provides an output which is normally positive-going except when a positive-going input is applied simultaneously to each of the used inputs of the gate circuit whereupon there is no output from the inverter. A circuit arrangement for such a device is shown in detail in FIG. 3C of the aforesaid copending patent application A. For brevity such a device will hereinafter be referred to as an "inverter."

The symbol shown, for example at B130 in FIG. 6, denotes a mixer or buffer device providing a positive-going output on its output lead when any one or more of its used inputs is supplied with a positive-going potential. A circuit arrangement for such a device is shown in detail in FIG. 5B of the aforesaid copending patent application A. For brevity such a device will hereinafter be referred to as a "mixer."

The symbol used, for example at S47 in FIG. 6, denotes a delay line of extended length with its associated driving, amplifying and shaping valve circuits and which is preceded by two alternatively operable multiple input "AND" gate circuits whereby a positive-going output is obtained after the predetermined delay interval time set by the delay line only upon the occasion of simultaneous positive inputs to the used input leads of either one of the two input gate circuits. A circuit arrangement for such a device is provided by the arrangement of FIG. 3B, followed by FIG. 9B, followed by FIG. 6B, followed by FIG. 7B, followed by FIG. 8B of the aforesaid copending patent application A. The number of digit intervals of delay time provided by the complete device between input and output is either 35 digit intervals or 42 digit intervals of the machine rhythm and this number is denoted by the figure within a circle shown on the symbol. As will be understood such a device is capable of holding either 35 or 42 binary digit signals within its circuits. For brevity such a device will hereinafter be referred to as either a "35 interval delay line" or a "42 interval delay line."

Unused inputs of any gate circuit or the like are shown by a T-shaped free end and in practice these are actually left unconnected. Where only one input is used to a gate the gating function obviously does not exist. A number of cathode follower circuits are provided in the actual machine for the purpose of affording a sufficiently low impedance signal source but in the interests of clarity of description and drawings these have been omitted as they make no difference to the manner of operation. Other symbols employed in the drawings such as hand switches or key switches, resistors and capacitors are of the conventional form.

The legends attached to input and output leads denote the reference identifications of various control and other waveforms which have a normal or "off" level of earth or below and an operative or "on" level which is positive to earth. These waveforms, in general, are identified as follows. Simple numerals define the respective pulses of a series of digit time pulses occurring in the different digit intervals of each beat. Thus the numeral "0" indicates the 0 digit time pulses each occurring in digit interval 0 of each beat and so on. These digit time pulses are generated in a manner similar to that shown in FIG. 11A of the aforesaid copending application A wherein pre-recorded signals in another separate address recording track on the magnetic drum of the main store 1 are read out and applied through suitable amplifier and squaring circuits to a delay time having a total delay time equal to one beat time, which delay circuit includes a multivibrator having an on-time period of about three quarters of one word or beat time and a natural off-time of more than one word or beat time whereby such multivibrator circuit is always set by a particular output pulse provided in each address signal pre-recorded in the aforesaid separate address recording track. The multivibrator circuit provides a short output pulse once in every beat time and this is applied to a serial chain of unit delays the respective outputs of which provide the different digit time pulses. The legend A denotes a waveform defining the multiple-beat A period for dealing with an A order, the legend B a similar waveform defining a similar multiple-beat B period for dealing with a B order and the legend C a further waveform defining the further period at the end of an operation cycle when the next order is being obtained. The A or B periods may have two or more successive beats dependent upon the type of order and the first of these known as the D beat is defined by waveforms denoted by the legend D. Similarly the legend E denotes waveforms which define the last beat of either an A or B period. The legend F refers to waveforms concerned with undecoded function or F digits of an order while waveforms bearing the legend G refer to those derived after partial decoding of the function digits. The legend I refers to waveforms derived from the outputs of the instruction delay line of the control system while the legend J relates to waveforms concerned with a so-called "jump" operation. The legends K and L refer to waveforms concerned with the first and last beats, similar to the D and E beats noted above, in the case of multiplication or division operations only. The legend M refers to control waveforms arising during a multiplication operation while the legend Q refers to similar waveforms operable during a division operation. The legend N refers to waveforms derived from partial decoding of the N digits of an order while the legend R refers to waveforms derived from a partial decoding of order digits specifying track selection in the main store. The legend S refers to waveforms derived from the instruction delay line for certain order digits other than those of the function digits while the legend T refers to timing waveforms which are combinations of selected individual digit time pulses. The legend U refers to waveforms which are the combination of certain T waveforms with the beat waveforms A, B, C, K or L. The legend X refers to control waveforms derived from the function digits of an order while the legend Y is applied to conductors or bus bars which actually carry signal pulse trains. The legend Z refers to hand switch inputs.

Some waveforms are also made available in their inverse form, i.e. a form which is normally at the "on" or positive level falling to a more negative or "off" level during those periods when the principal waveform is at its "on" level. Such inverse versions are denoted by the addition of the prefix "~" to the legend.

DESCRIPTION OF MACHINE

*The main store 1*

The main or low speed store, illustrated at 1 on the diagram of FIG. 1 is of the magnetic drum type in which information is stored in 36 channels, each of which comprises two circumferential tracks around the drum surface. Four of the available channels are non-erasible and are employed for registering initial orders, test routines and so forth. The remaining 32 channels are of the erasible type and are used for registering the various number words and the programme order words.

Each channel contains separate storage locations for 128 words arranged as 16 blocks of 8 words and arrangements (not shown) are provided whereby words may be transferred to or from the main store either individually or in blocks of 8.

The main store thus has a total capacity of 4608 words of which 4096 are available for normal registration of order words and number words.

HIGH SPEED COMPUTING STORE

The arrangements of the high-speed store 10 of FIG. 1 are shown in FIG. 6 and comprise a first block 2 of 7 accumulator registers, four further blocks 4 each of 8 high speed storage registers and a group 3 of other sources of and destinations for signals. In the interest of simplicity only selected elements of these blocks and groups are shown in FIG. 6.

The first accumulator register ACR1 (address number 1) comprises a 42-interval delay line S47 provided with a regenerative loop completed through gate S36 to one of its input gates. This input gate is controlled by the output of inverter S27 supplied with the X38 waveform and the output from gate S17 which is controlled by outputs from the N digit staticisors to be described later. An alternative signal input to the same input gate of the delay line S47 is from gate S26 which is fed through unit delay S16 with signals on the bus bar Y34 from the main store 1. Gate S26 is controlled by the output from unit delay S15 which output is also applied through inverter S25 as one controlling input for the regeneration loop gate S36 whereby only one of the two alternative inputs to the delay line can be operative at any one time.

The opposite input gate of the delay line S47 is supplied with signals from the mill 5, FIG. 1, over bus bar Y2 through unit delay V51. This second input gate of the delay line S47 is also controlled by the output from gate S17 as is a further unit delay S77 which provides a connection from the output of the delay line S47 to output bus bar Y40 which provides one source of input signals for the computing unit 5. The same output from unit delay S77 is applied to double-entry gated delay V54 which is provided with a regeneration loop through its opposite entry gate. This regenerative loop is controlled by the 40 digit-line pulse waveform. This delay V54 operates to copy the form of signal existing in the 39 digit position into the 40 digit position and its output supplies bus bar Y41 leading to the computing unit 5.

The output from the delay line S47 is also made available through gate S57, controlled by ~S9 and S10 waveforms which are derived from the X-digit staticisors to be described later, through a double-entry gated delay V36, also controlled by the output from an X-digit staticisor, and thence through a further double-entry gated delay V57 to the bus bar Y44 also serving the computing unit 5. The last-mentioned double-entry gated delay is also arranged with a regenerative loop and operates to extend the output signal by copying the signal in its 39 digit position once into the 40 digit position like the delay V54.

A further double-entry gated delay S58, controlled by the output from one of the M digit staticisors as described later, provides a direct connection from either the first or second signal inputs to the delay line S47 through to the output bus bar Y47 leading to the control system 9 by way of another double-entry gated delay V59, which is controlled by outputs from the other M digit staticisors, and two serially connected unit delays V69 and V79.

The further 6 accumulator registers ACR2, ACR3 . . . ACR7 of the group 2, FIG. 1, are generally similar to the register ACR1 except for elimination of the alternative (main store) input over bus bar Y34 to the first input gate of the associated delay line. The accumulator register ACR2 (address number 2) has been shown in full but only a brief indication of the input and output connections of accumulator registers ACR3 (address number 3) and ACR7 (address number 7) have been illustrated in order to reduce the complexity of the drawing.

There is also an address number 0 which, being devoid of any connections, serves as a source of zero signal or a means of eliminating or erasing a word signal.

Each of the high speed computing store registers (whose addresses are numbered 64 . . . 95) in the four blocks 4, FIG. 1, each of 8 registers, is of identical form and of these only the first and last (address numbers 64 and 95) have been shown in FIG. 6. As will be seen such registers comprise a 42-interval delay line such as that shown at Y78 for register 64. This delay line is arranged with a regenerative loop from its output to one of its signal input gates, such signal input gate being controlled by the output of an inverter Y68 which is controlled in turn by the output from gate Y58. The latter also controls the opposite signal input gate of the delay line by which signals are fed from the common input bus bar Y35 carrying input signals either from the computing unit 5 over bus bar Y2 or from the main store 1 over bus bar Y34. The output from the delay line Y78 is made available through unit delay Y96 to the common bus bar Y40 leading to the computing unit 5 and to the control system 9.

In addition to such first block of 7 accumulator registers and 32 computing store registers a number of further addresses are provided which act as destinations for or sources of signals such as those representing constants. Two of these are illustrated as so-called registers 30 and 33 and comprise, substantially, a unit delay such as shown at V6 for register number 30. This unit delay is controlled by the N03 and N10 waveforms which are derived from the N digit staticisors. This unit delay V6 serves, when energised, to allow the passage of the 38 digit time pulse waveform therethrough. Such 38 digit time pulses coincide in timing with the sign digit of any number word pulse signal train and consequently the register 30 is equivalent to a source of signals representing −1. Similarly the computing store register 33 is provided with the 25 digit time pulse waveform which, when released by selection of this register, is the equivalent of a source providing a signal of digit value $2^{-13}$.

In similar manner, unit delay H50, controlled by the N01 and N15 waveforms (address number 15) from the N digit staticisors, serves to connect the outputs from a plurality of gates H10 . . . H48 to the bus bar Y40. Each of the gates H10 . . . H48 is supplied with a different one of the series of digit time pulse waveforms and is controlled by an individual hand-operated keyswitch *hs*0 . . . *hs*38 by which the related gate input lead can be connected to a source of positive potential +13 v. Thus when, for example, hand switches *hs*0 and *hs*38 are thrown and the unit delay H50 operated by the appropriate N waveforms, the 0 digit time pulse and the 38 digit time pulse will be released to form a number signal 1000 . . . 0001 on the bus bar Y40. In generally similar manner other of these auxiliary addresses or registers can provide for a connection to hand switches as a source of input signals and/or to input or output mechanism for feeding in or reading out data from the machine. For example, the unit delay S108, controlled by outputs from the N digit staticisors, provides an output potential when operated which causes the opening of either of gates S200 or S201 by which a lead 60 may be connected either to the bus bar Y35 or to the bus bar Y40. Such lead 60 is connected through other selector switch means, not shown, to both input and output mechanism such as a tape reader and a teleprinter.

COMPUTING UNIT

Figure 7:
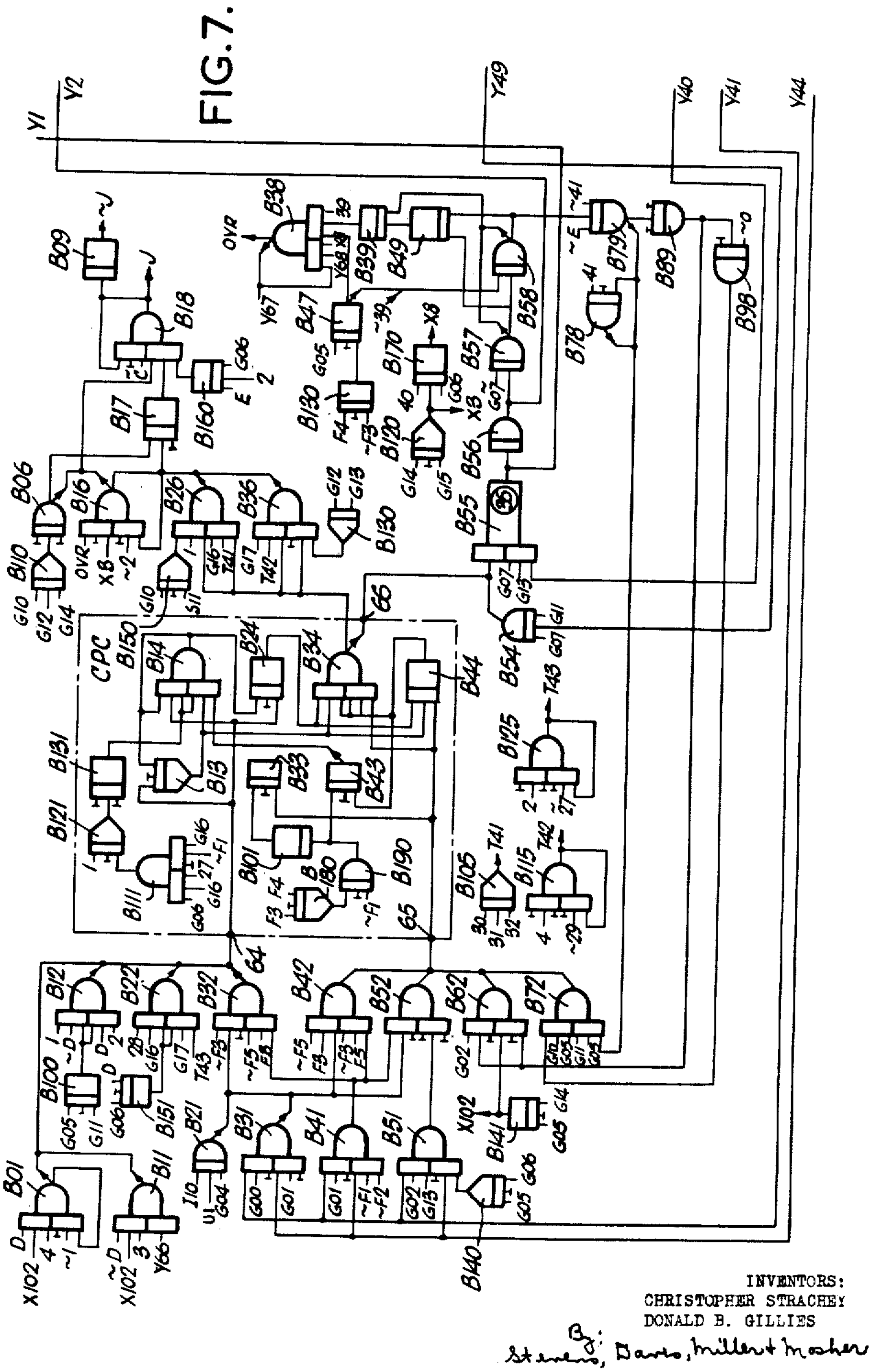
FIG. 7 is a similar more detailed block schematic diagram of the arrangements of the computing unit.

The arrangements of the computing unit 5 are shown in FIG. 7 and broadly comprise means including a multi-purpose computing circuit of known form whose elements are shown enclosed within the rectangle CPC capable of effecting a number of different arithmetical or logical operations including addition, subtraction, "and" and "not equivalent to" dependent upon the manner of energisation of a number of different control leads. One input 64 to the computing circuit CPC is supplied from a plurality of double-entry gated delays B01, B11, B12, B22 and B32 while the second input 65 to the computing circuit is supplied from a plurality of further double-entry gated delays B42, B52, B62 and B72. The bus bar Y41 from the computing store 10 is connected to one input side of each of three further double-entry gated delays B31, B41 and B51 while the bus bar Y44 is likewise connected to the second input side of each of such double-entry gated delays. The output from the delay B31 is applied to one input side of each of the three delays B32, B42, B52 while the output from the delay B41 is fed to the same input side of delay B52 and to the opposite signal input side of each of the delays B32 and B42. The output from delay B51 is fed to the opposite input side of delay B52. By suitable arrangement of the controlling waveforms supplying the various double-entry gated delays it can be arranged that the signals on bus bar Y41 are fed either to the first input 64 or to the second input 65 of the computing circuit CPC whilst the signals on the other bus bar Y44 are fed to the opposite input 65 or 64 of the computing circuit.

The control of the manner of operation of the computing circuit CPC is effected by the configuration of the F digits of an order in a manner which will become more readily apparent later.

The output 66 from the computing circuit CPC is connected to one signal input gate of a 35-interval delay line B55 the output of which is then fed through a unit delay B56 to the output bus bar Y2 which supplies the high-speed computing store 10. The same signal input gate of the delay line B55 is also capable of being supplied with input signals arriving over bus bar Y49 through a unit delay B54 controlled by the G07 and G11 waveforms. The second signal input gate of the delay line B55 is supplied from the bus bar Y40 under the control of the G07 and G13 waveforms.

The arrangements of the computing unit include an overflow staticisor B38 used for detecting whenever an answer number is increased beyond the range of the machine as described in greater detail in our copending application Ser. No. 560,830, filed January 23, 1956, the arrangements comprising double-entry gated delays B06, B16, B26, B36, inverter B17, double-entry gated delay B18 and further inverter B09 for generating the jump or J and ∼J waveforms and arrangements including unit delays B78, B79, B89 and B98 by which a completed circulating path having a total delay time of either 41, 42 or 43 digit intervals may be provided within the computing unit. These latter arrangements are used during performance of multiply or divide orders or shift orders.

The operation of the computing unit is, so far as the present invention is concerned, as follows. The nature of the operation to be performed, determined by the F digits of the order, causes appropriate energisation of the various control leads whereby the various elements, more particularly those of the computing circuit CPC are set into the appropriate condition to effect the required computing operation, for example addition or subtraction. A first operand signal from a register or source determined by the N digits of the order arrives over bus bar Y41 simultaneously with a second operand signal over bus bar Y44 from an accumulator register determined by the X digits of the order. The nature of the operation to be performed, determined by the aforesaid F digits of the order, also causes appropriate opening of the double-entry gated delays B31, B41, B51, B32, B42 and B52 whereby the signals are each appropriately routed to the correct input of the computing circuit. Thus, if the operand from the N digit address is to be subtracted from the operand from the X digit address, the signals on bus bar Y44 pass through delays B31 and B32 to input 64 while the signals on bus bar Y41 pass through delays B41 and B42 to input 65. Conversely, if the X digit operand is to be subtracted from the N digit operand, the signals on bus bar Y41 pass through delays B31 and B32 to input 64 and the signals on bus bar Y44 pass through delays B41 and B42 to input 65.

The result-representing output signal derived from such computing circuit CPC on output lead 66 then passes through the delay line B55 and further delay B56 to the bus bar Y2 whereby it eventually arrives at its destination with the correct timing but in the next following beat period.

ORDER CODE

The various orders capable of being performed by the machine are set out in the attached code list. The particular code number is defined by the F digits of an order, the least significant decimal digit being signalled by the three digits *f*0, *f*1, *f*2 and the most significant decimal digit by the three digits *f*3, *f*4, *f*5.

In the code terminology a capital letter refers to an address of a register while a small letter refers to the number in the register before the order is obeyed and a small letter primed to the number in the register after the order has been obeyed.

N is the address of any register in the computing store; X is the address of any accumulator; *c* is a counter; P refers especifically to accumulator register number 6 and Q to accumulator register number 7 in multiply and divide operations only while *pq* and *xq* refer to double length numbers.

00 $x'=n$
01 $x'=n+x$
02 $x'=-n$
03 $x'=-n+x$
04 $x'=n-x$
05 $x'=n\&x$
06 $x'=\overline{\neq}x$
07

10 $n'=x$
11 $n'=x+n$
12 $n'=-x$
13 $n'=-x+n$
14 $n'=x-n$
15 $n'=x\&n$
16 $n'=x\overline{\neq}n$
17

20 Multiply $$(pq)'=n.x$$

21 Multiply and round-off in X6, $$p'=(n.x)_r$$

22 Multiply and add $$(pq)'=n.x+(pq)$$

23 Justify $(nq)$.
24 Divide, unrounded $$q'=(xq)/n. \quad p'=\text{remainder}$$

25 Divide rounded $$q'=((xq)/n)_r. \quad p'=\text{remainder}$$

26
27

30
31
32
33
34
35

36
37

40 $x'=c$
41 $x'=c+x$
42 $x'=-c$
43 $x'=-c+x$
44 $x'=c-x$
45 $x'=c\&x$
46 $x'=c\overline{\neq}x$
47

50 Single-length shift up.
51 Single-length shift down (rounded).
52 Double-length shift up.
53 Double-length shift down.
54 Normalize $(pq)'=2^{\mu}(pq)$. $x'=x-\mu$.
55
56
57

60 Jump if $x=0$.
61 Jump if $x\neq0$.
62 Jump if $x>0$.
63 Jump if $x<0$.
64 Jump if overflow indicator clear.
65 Jump if overflow indicator set.
66 Unit-modify.
67 Unit-count.

70 Single-word read from main store.
71 Single-word write to main store.
72 Block read from main store.
73 Block write to main store.
74 External switching for input/output.
75 Stop.
76
77

CONTROL SYSTEM

*Beat counter*

Figure 3:
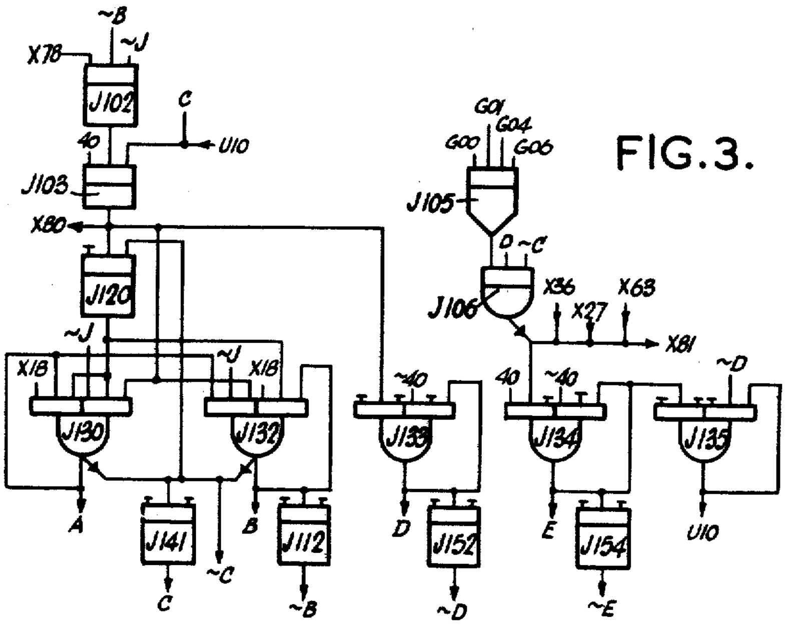
FIG. 3 is a more detailed block schematic diagram illustrating the arrangements of the beat counter used for controlling the machine rhythm.

The arrangements of the beat counter portion of the control system, which serve to determine the appropriate beat-by-beat periods of the machine rhythm, are shown in FIG. 3. They comprise a group of five double-entry gated delays J130, J132, J133, J134 and J135 each of which is arranged as a trigger circuit by back coupling its output to one of its alternative signal input gates in a manner similar to that described in the aforesaid application A.

The opposite signal input gate of the delay J130 is supplied with the output from an inverter J120 which in turn is controlled by the output from a gate J103 one of whose controlling inputs is derived from a further inverter J102. The output of the inverter J120 also controls the regeneration input of the delay J132 while an output from the gate J103 provides a signal input to the delay J130.

The delay J134 is supplied with a signal input from a unit delay J106 one of whose controlling inputs is derived from a mixer J105 which is supplied with a number of G waveforms derived from partially decoded F digits of the order.

The delay J130 provides the A waveform defining, by its "on" periods, the A periods of the machine rhythm while the output from the delay J132 similarly provides the B waveform defining the B periods of the machine rhythm. An inverse version of this B waveform, ~B waveform, is derived from inverter J112. The outputs from the two A and B delays J130 and J132 are combined to form the inverse version, ~C, of the C waveform which itself is provided by the output from the inverter J141.

The output from the delay J133 forms the D waveform defining, by its "on" periods, the D beat periods of the machine rhythm while an inverter J152 provides the inverse version, the ~D waveform. The output from the delay J134 provides the E waveform similarly defining the E beat periods of the machine rhythm while the inverter J154 provides the inverse version of this waveform, the ~E waveform. The final delay J135 provides the *u*10 waveform which is used as one controlling input to the gate J103.

The operation of this beat counter is as follows:

Assuming that the D beat of a C period is in existence at the moment, the A trigger circuit of double-entry gated delay J130 will be "off." The waveform X78 is normally "off" and in consequence inverter J102 will provide an output to gate J103 which, in combination with the C waveform now "on," will provide an output pulse at the 40-digit time constituting the X80 waveform. This pulse when applied to one signal entry of double-entry gated delay J130 in combination with the "on" signal from the inverter J120 (the A waveform is "off") will start the trigger circuit comprising delay J130 as the X18 waveform (an inverse version of a start signal) is normally "on." The A waveform thus commences at the end of digit time 40 of the immediately preceding beat.

At the same time the signal from gate J103 will set the trigger circuit around double-entry gated delay J133 to the "on" state and this will persist until the following 40 digit pulse time to provide the D waveform defining the D beat of the A period. The normally "on" ~D waveform will accordingly go "off" for this beat.

The D beat of the A period is thus now in existence and for normal orders with which the present invention is concerned, i.e. those of the order groups 00–06, 10–16, 40–46 and 60–66 of the order code, the mixer J105 will provide an output due to the presence of one of the applied G waveforms which are derived from the F digits of the order as described later. As the D waveform is "on" and ~C waveform is also "on," unit delay J106 will provide an output to one signal input of the double-entry gated delay J134, which, at the next 40 digit pulse time, i.e. at the end of the D beat, becomes energised to set the trigger circuit formed therearound in the "on" state so as to provide the E waveform defining the E beat. The D waveform ceases at the same instant due to the ~40 digit pulse waveform applied to the gate controlling the regeneration loop around the delay J133. The E beat of the A period is thus now in existence.

The "on" state of the trigger circuit comprising delay J134 sets the trigger circuit around the further double-entry gated delay J135 to the "on" state at the next following digit interval, i.e. digit interval 41, to provide the *u*10 waveform and this, applied as an alternative input for the C waveform to the gate J103, causes the generation of another pulse in the X80 waveform at the next following 40 digit pulse time, i.e. at the end of the E beat.

As the A waveform is still "on," this pulse in the X80 waveform will inhibit the output from inverter J120 and will reset the trigger circuit around delay J130 to the "off" state whereby the A waveform ceases, thus to make the end of the A period. Simultaneously, however, the X80 waveform applied to one signal input of the delay J132 will set the trigger circuit therearound to the "on" state owing to the applied A waveform (which does not cease until the end of the 40 digit interval owing to the additional unit delay inherent in the delay J130) whereby the B waveform goes "on" at the instant the A waveform goes "off" to define the commencement of the following B period. Simultaneously the trigger circuit around the delay J133 becomes set "on" again by the X80 waveform pulse until the following 40 digit pulse time to make the D waveform "on" again thereby defining the D beat of the B period. Assuming the new order now operative is also one of normal two-beat length, the X81 waveform from the unit delay J106 is set "on" again whereby the E waveform goes "on" at the following 40 digit pulse time coincident with the termination of the "on" period of the D waveform thereby defining the succeeding E beat of the B period. The trigger circuit around delay J135 is similarly set "on" at the same time to provide the *u*10 waveform whereby, at the next following 40 digit pulse time, i.e. at the end of the B beat of the B period, the gate J103 again provides a pulse in the X80 waveform which, as there is now the B waveform to energise the other input of the inverter J120, causes the latter again to inhibit its output and thereby to break the regenerative loop of the trigger circuit around delay J132. This marks the termination of the B period.

As both of the A and B waveform trigger circuits around delays J130 and J132 are now set "off," the inverter J141 provides an "on" output which constitutes the C waveform defining the C period. This C period lasts for one beat only, a D beat, which is marked by the setting "on" of the trigger circuit around delay J133 as before. At the next following 40 digit pulse time the simultaneously present inputs of the C waveform and the output from inverter J102 at gate J103 causes a further pulse in the X80 waveform to set the A waveform trigger circuit around delay J130 to the "on" state again and so to recommence the cycle.

If the operative order is one requiring more than the normal two-beat period for its completion, there is a consequential lack of any operative input to the mixer J105 and the trigger circuit around the delay J134 is not set "on" at the 40 digit pulse time of the D beat but remains "off" until the approaching end of the operation called for by such order is signalled by an input constituted by one of the waveforms X36, X27 and X63 which then provide an alternative "on" potential in the X81 waveform to initiate the last E beat of the particular A or B period which is concerned and thereby causes the cycle to resume its normal sequence.

It will thus be seen that there are provided waveforms A, B and C which define the A, B and C periods and also beat waveforms D and E defining the first and last beats of either the A or the B periods although the D and E beats may not be consecutive. It will be noted also that in actual timing the various period and beat defining waveforms commence at the beginning of the 41 digit pulse time of the immediately preceding beat and terminate at the end of the 40 digit pulse time of the beat or period which they serve to define.

CONTROL INSTRUCTION LINE

Figure 4:
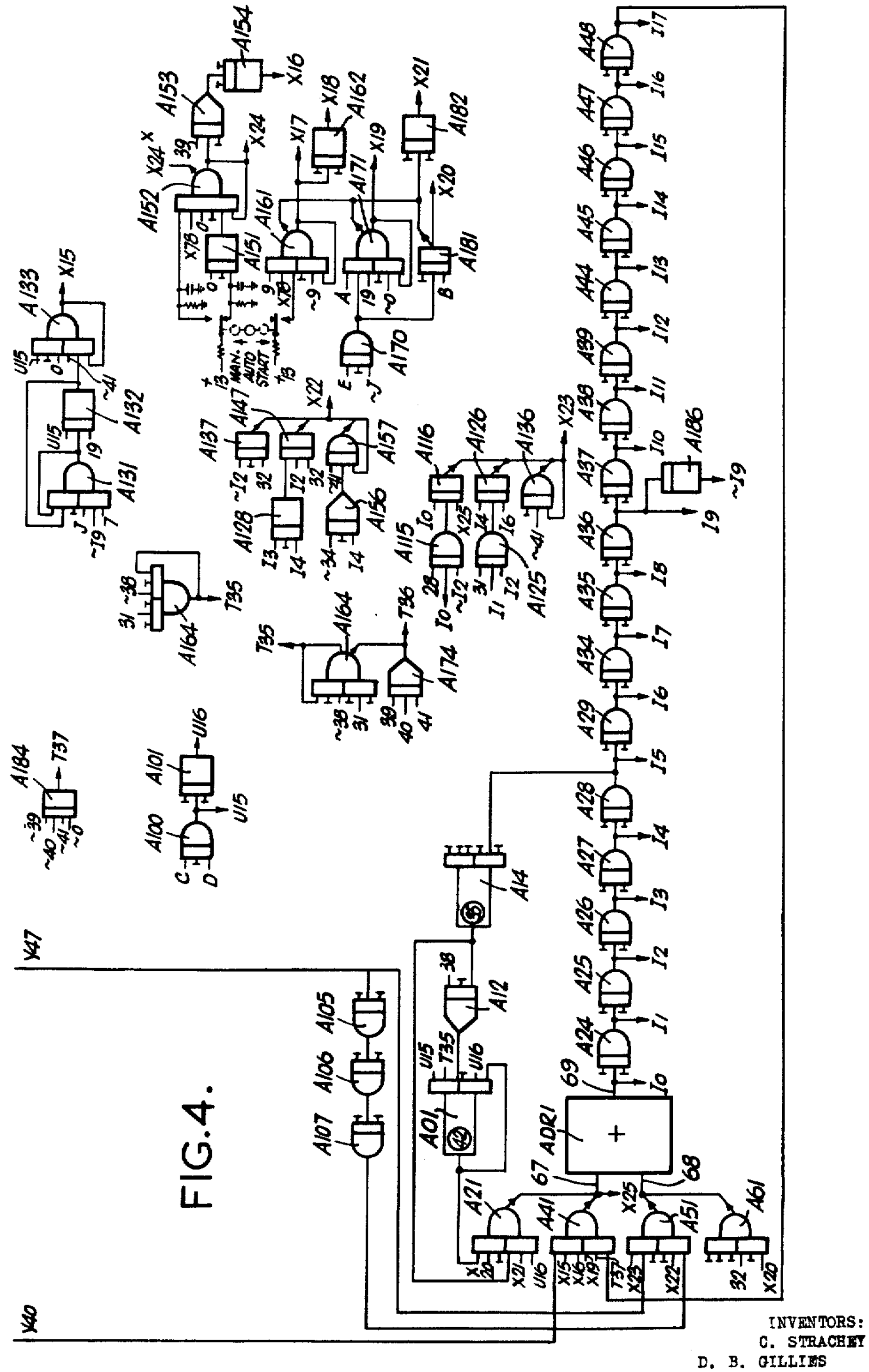
FIG. 4 is a similar more detailed block schematic diagram showing the arrangements of the control line of the control system.

The arrangements of the control instruction line of the control system are shown in FIG. 4 and comprise a serially connected chain of unit delays A24, A25 . . . A48. The input to the first unit delay A24 is derived from a logical adding circuit ADR1 which can be of any well known form serving to provide on lead 69 an output representative of the addition of two separate input pulse trains simultaneously present on leads 67 and 68. The first input to the adder ADR1 on lead 67 is derived through one or other of the two double-entry gated delays A21 or A41 while the second input to the adder on lead 68 is derived through one or other of the two double-entry gated delays A51, A61. The output from the last unit delay A48 of the chain is fed back to the delay A41 while a tapping at the output of unit delay A28 is applied to one input of a 35-interval delay line A14. The output from the latter is fed direct to one input gate of the delay A21 and is also applied through mixer A12 to one input of a further 42-interval delay line A01. The output from the latter is applied to the opposite input gate of the delay A21 and is also fed back to its own alternative input gate to form a word storage loop. This loop serves to hold a number representing the address in the computing store 10 of the last selected order word.

One external input to the control instruction line is over the bus bar Y40 to the delay A41 supplying the first input lead 67 of the adder ADR1. A second external signal input is from the bus bar Y47 either directly to one input gate of the delay A51 or by way of three serially arranged unit delays A105, A106, A107 to the opposite input gate of the same delay A51.

The control waveform X20 used at delays A21 and A61 is derived from the gate A181 and is normally "on" during the E beat of each B period while control waveform X21 used at delay A21 is derived from the inverter A182. The control waveform X15 is derived from the double-entry gated delay A133, the control waveform X16 from the inverter A154, the control waveform X19 from the double-entry gated delay A171 and the timing waveform T37 from the gate A184. The control waveform X23 for double-entry gated delay A51 is derived from the gates A116, A126 and unit delay A136 while the control waveform X22 is derived from the gates A137, A147 and unit delay A157. The U15 waveform controlling one input of the delay line A01 is derived from the unit delay A100 and the timing waveform T35 from the double-entry gated delay A164 while the U16 waveform controlling the opposite entry of this delay line is derived from the inverter A101.

A plurality of separate instruction line output waveforms I0, I1, I2 . . . I17 are derived respectively from the output lead 69 of the adding circuit ADR1 and the outputs of the successive unit delays A24, A25 . . . A48. Each of these instruction line outputs is of similar form but of progressively delayed timing each being one digit interval later than its predecessor. Thus the output from the adder ADR1 is, as will be seen later, 3 digit intervals late on standard time; therefore the instruction line output I1 is 4 digit intervals late on standard time, the instruction line output I2 5 digit intervals late on standard time and so on, the instruction line output I17 being 20 digit intervals late on standard time. The instruction line output I9 is also made available in inverse form as the ~I9 waveform through inverter A186.

N-DIGIT STATICISORS

Figure 5:
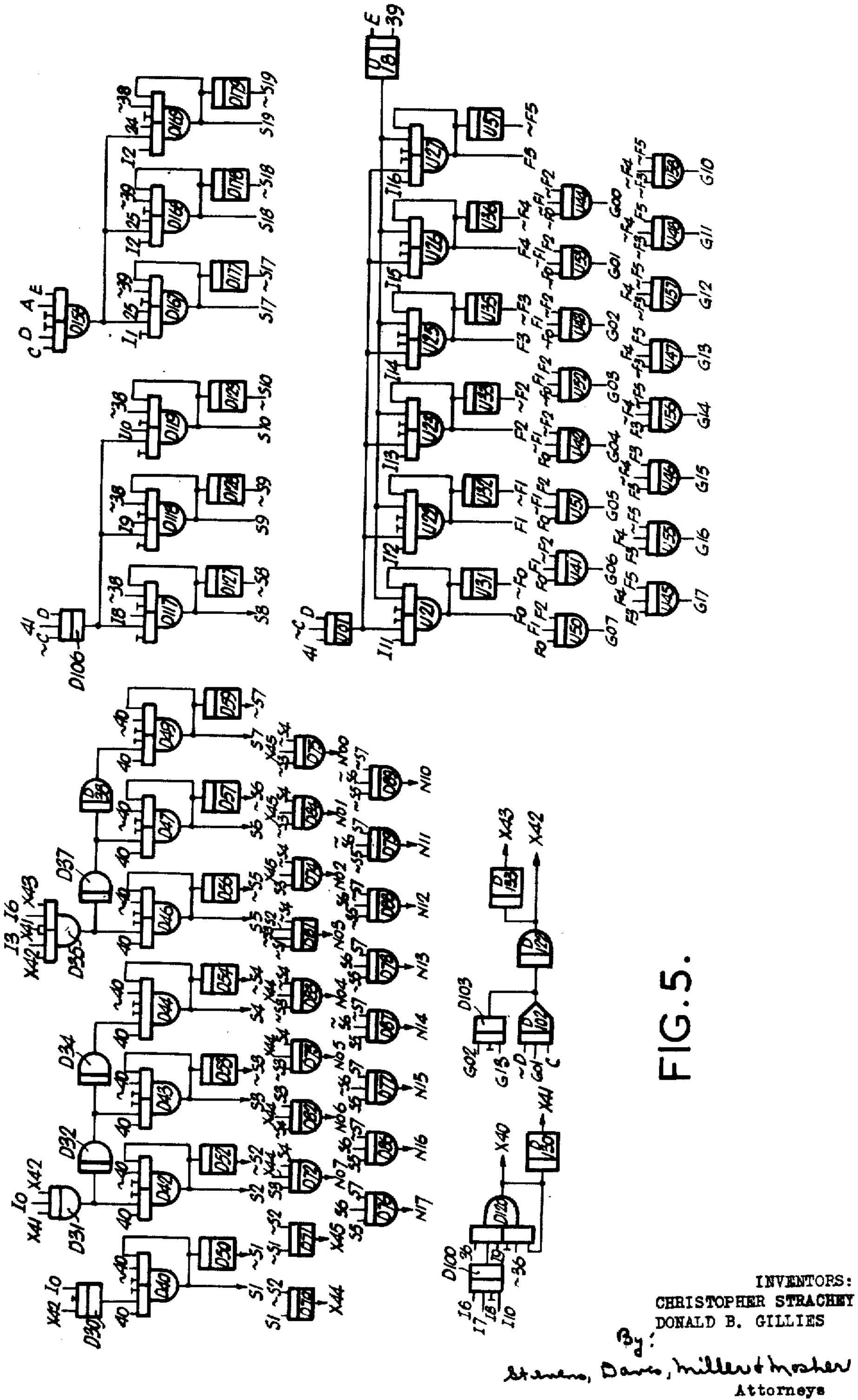
FIG. 5 is a similar more detailed block schematic diagram of the various staticisor and associated decoding arrangements for dealing with the different groups of digits of an order.

The staticisors for dealing with the N digits of an order are shown in FIG. 5 and comprise a group of seven double-entry gated delays D40, D42, D43, D44, D46, D47 and D49 each arranged as the equivalent of a trigger circuit by the completion of a regenerative loop from its output back to one of its alternative input gates. Each of such gates is controlled by the ~40 digit pulse waveform whereby it is open except during each 40 digit interval. The direct output from each of these double-entry gated delays provides respectively the S1, S2 . . . S7 waveforms while an inverse version of each waveform is made available through the associated inverters D50, D52 . . . D59.

The signal input to the first delay D40, which deals with the most significant of the N digits, *n*6, of an order, is derived from gate D30 fed with the I0 output from the control instruction line. This gate is also controlled by the X42 waveform derived from unit delay D122 while the entry gate of the delay D40 is also supplied with the 40 digit pulse waveform whereby it tests the incoming signal during digit interval 40 and sets the trigger circuit "on" if the tested digit is of value "1" and leaves it reset "off" if of value "0."

The signal input gate of the next delay D42 is derived from the unit delay D31 which is also fed with the I0 waveform and is controlled by the X41 and X42 waveforms. The X41 waveform is derived from inverter D130. The output from this unit delay D31 is also applied through further unit delay D32 to the signal input gate of the delay D43 and through a further unit delay D34 to the similar signal input gate of the next delay D44.

The delay D46 derives its signal input from a double-entry gated delay D35 one input gate of which is supplied with the I3 output from the control instruction line and is controlled by the aforementioned X41 and X42 waveforms; the other input gate of the delay D35 is supplied with the I6 output from the control instruction line and is controlled by the X41 and X43 waveforms, the latter being derived from the inverter D133. The output of this delay D35 is also applied through a further unit delay D37 to the signal input gate of the delay D47 and by way of a further unit delay D38 to the similar signal input gate of the last delay D49 which deals with the least significant of the N digits, *n*0.

The various staticised outputs, which are dependent upon the configuration of the N digits of an order, are combined in partial decoding circuits consisting of gates D70, D71 and D81 and unit delays D72, D82, D73, D83, D74, D84, D75, D76, D86, D77, D87, D78, D88, D79 and D89.

The operation of these staticisor arrangements closely resembles those of the aforesaid copending patent application A, the particular digit signal available at the digit pulse time 40 being tested at the signal input gate of the related double-entry gated delay whereby a pulse signal commences to circulate around the regeneration loop if the tested digit signal is a "1" and continues to do so until the opposite entry gate is closed by the ~40 pulse waveform at the following digit pulse time 40. Alternatively, if the input signal is devoid of any pulse, i.e. of value "0," no pulse circulation is commenced and the trigger circuit remains in its normal or "off" state.

Various combinations are made of the trigger circuit outputs dealing with the most significant 4 digits of the N address digits to form the waveforms N00, N01 . . . N07 while a similar decoding of the outputs from the trigger circuits dealing with the 3 least significant N digits provides the N10, N11 . . . N17 outputs. A configuration of N digits representing address number 5, i.e. 0000 101, will cause the waveforms N00 and N15 each to become on, the others remaining off. Similarly an N digit configuration representing address number 67, i.e. 1000 011, will cause the N04 and N13 waveforms to be on, the remainder being off. It will be noted that these staticised outputs persist for one beat time only. It will also be observed that, when each of the N-digit trigger circuits is in its quiescent or "off" state the N00 and N10 waveforms are "on." These waveforms, which define the address number 0 and which is physically non-existent, are therefore normally present at all times when the N-digit staticisors are not otherwise set.

X-DIGIT STATICISORS

The staticisor arrangements for dealing with the X-digits of an order are also shown in FIG. 5 and comprise the three double-entry gated delays D117, D118 and D119, arranged in similar manner to those of the N digit staticisors already described. The signal entry gate of delay D117 is fed with the I8 waveform output from the control instruction line, the next delay D118 with the I9 waveform output from such line and the third delay D119 with the I10 waveform output from such line. The entry gate of each of the said delays is controlled by the output from gate D106 which is fed with the 41 digit pulse waveform together with the ~C and the D waveforms while the opposite entry gate controlling the regenerative loop of each trigger circuit is fed with the ~38 digit pulse waveform.

In the operation of these X staticisor arrangements, each trigger circuit is set "on" or "off" in accordance with the configuration of the related X digit at digit pulse time 41 of each D beat except those occurring in the C period and they all become reset "off" again at the next following digit interval 38. The resultant S8, ~S8, S9, ~S9, S10 and ~S10 waveforms which control the connection of one of the accumulator registers 0–7, FIG. 6, to the bus bar Y44, FIG. 6, accordingly become effective from digit interval 0 to digit interval 38 of each D beat in periods A and B.

M-DIGIT STATICISORS

The staticisor arrangements for dealing with the M digits of an order comprise the three double-entry gated delays D167, D168 and D169 arranged as trigger circuits similar to those of the N- and X-digit staticisors previously referred to. They serve to provide respectively the S17, S18 and S19 waveforms and their inverse versions ~S17, ~S18, ~S19 used for controlling the connection of one of the accumulator registers numbered 0–7, FIG. 6, to the bus bar Y47.

The signal input entry to the first delay D167 is the I1 output from the control instruction line whereas that of the two delays D168 and D169 is the I2 output from such line. The three entry gates are each controlled by the output from a double-entry gated delay D156 one input gate of which is controlled by the C and D waveforms and the other by the A and E waveforms. The digits tested in the first two delays D167 and D168 are those occurring at the 25 digit pulse time while that in the remaining delay D 169 is that existing at the 24 digit pulse time. Each of the trigger circuits of delays D167, D168 is reset to zero at the 39 digit pulse time immediately following its setting by the ~39 pulse waveform applied to the entry gate which controls the regeneration loop while the remaining trigger circuit of delay D169 is reset to zero at the 38 digit pulse time immediately following its setting by the ~38 pulse waveform.

In the operation of thees M-digit staticisor arrangements, the three trigger circuits are conditioned for setting during either the D beat of period C or the E beat of period A by the output from the delay D156. According to the form of the signal arriving from the control instruction line at the 24 or 25 digit intervals of the particular beat concerned so each trigger circuit will be set accordingly and reset to zero again at the next following 38 and 39 digit interval.

F-DIGIT STATICISORS

The staticisor arrangements for dealing with the F digits of an order comprise the 6 double-entry gated delays U21, U22 . . . U27 which are arranged as trigger circuits similar to those of the N-, X- and M-digit staticisors already described and serve to provide respectively the F0, F1, F2 . . . F5 outputs and their inverse versions ~F0, F1 . . . ~F5. The signal input gates of each of these trigger circuits are provided respectively with the I11, I12, I13 . . . I16 outputs from the control instruction line and are conditioned to open at the 41 digit interval in each D beat, except that which occurs during the C period, by the output from the gate U01. The resetting of the trigger circuits is effected by the cessation, at the 39 digit interval during each E beat, of the normally-present ouput of the inverter U18. The various outputs from these F trigger circuits, of which the output F0 is determined by the nature of the most significant F digit *f*5 and the output F5 by the nature of the least significant F digit *f*0 of any order, are partially decoded in two groups of three, the group F0, F1, F2 and their inverse versions being dealt with by the eight unit delays U50, U41, U51, U42, U52, U43, U53 and U44 to provide the G07 . . . G00 outputs and the remaining least significant group of outputs F3, F4 and F5 and their inverse versions being dealt with by the unit delays U45, U55, U46, U56, U47, U57, U48 and U58 to provide the G17, G16 . . . G10 outputs.

Thus a function digit configuration representing order number 02, i.e. 000 010, will cause the outputs G00 and G12 to become active or "on," the remaining G waveforms being "off." Similarly the function digit configuration for order number 63, i.e. 110 011, will cause the G06 and G13 outputs only to become "on." It will be noted that the function digit configuration once set up in the D beat remains set up until the end of the next following E beat which may be the succeeding beat or several beats later dependent upon the type of function being performed.

OPERATION

A control address number, specified by signals in the positions of digit intervals 31 . . . 37 of a signal at standard time and indicative of the address of the last used order word, is continuously circulating around the control number register constituted by the 42 interval delay line A01, FIG. 4, and its direct regenerative loop, the waveform U16 from inverter A101 being normally "on." The timing of this circulating signal is one digit interval late on standard machine time.

During the E beat of the B period, waveform X20 from gate A181 goes "on" and allows this number signal to be read out from the delay line A01 through double-entry gated delay A21 to one input of the adding circuit ADR1. During this same beat, the X20 waveform also allows a 32 digit time pulse to be released through the double-entry gated delay A61 to the second input of the adding circuit ADR1. This 32 digit time pulse coincides in timing with the least significant digit position of the existing control address number signal arriving at the opposite input to the adding circuit.

The resultant output from the adding circuit is accordingly the original control address number increased by unity and this new number signal flows down the line of unit delays A24, A25 . . . A48. It also flows from the output of unit delay A28 to one input gate of the 35 interval delay line A14 and thence through mixer A12 to the opposite signal entry gate of the delay line A01. Due to the fact that the adding circuit ADR1 itself imposes a delay of one digit interval the arrival of the control address number train at delay line A01 coincides with the beginning of the following beat, i.e. beat D, of the next, C, period. At this instant the U15 waveform from delay A100 goes "on" and the U16 waveform goes "off" whereby the original number in the delay line A01 is erased and the new number from mixer A12 is inserted in its place.

The control address number signal present in the control line of unit delays A24 . . . A48 provides appropriate outputs I0 . . . I17. These are fed to the various points on the machine including the N-digit staticisors comprising the delays D40 . . . D49 of FIG. 5. These operate to test the significance of the successive digits in the different control line outputs at 40 digit interval time and in consequence the various N staticisors become set up according to the configuration of the aforesaid seven digits constituting the control address signal in the control line. This occurs at the end of the E beat of the B period. Owing to the insertion of a 38 digit time pulse through mixer A12, FIG. 4, into each control address number entering the storage delay line A01, the source of an order word as defined by the control address number is limited to one in which the *n6* digit is of value "1." This implies a register having an address number between 64 and 127 but of this range only addresses 64–95 are actually present in the machine being described. These are all in the high speed register groups 4, FIG. 1. In consequence, one only of the register control gates, such as Y58 or Y302 shown in FIG. 6, is opened by the particular combination of two N waveforms made available from the decode arrangements associated with the N-digit staticisors. It will be assumed that the control address number digits were 1000 000 (computing store register address 64). Gate Y58, FIG. 6, is accordingly opened and provides an "on" output which opens the output unit delay Y96 leading from the output of the delay line Y78 to the bus bar Y40. This opening period commences during what is a gap digit period of the signals circulating in the delay line Y78 whose timing is such that the output signals therefrom are synchronised with the standard machine time.

The beat counter, FIG. 3, now operates to change from the state where the B and E waveforms are "on" to the state where the C and D waveforms are "on" by the beginning of digit interval 0 of what is now the D beat of the C period. The word signal (actually the next required order word) previously held in the selected register of delay line Y78 then flows to the bus bar Y40, being one digit interval late on standard time due to the unit delay Y96. This signal cannot enter the computing unit 5, FIG. 5, from the bus bar Y40 as the F digit staticisors are still unset and the entry to the delay line B55 is accordingly blocked. Instead, this order word signal flows to the double-entry unit delay A41, FIG. 4, where, owing to the X15 and X16 waveforms derived respectively from double-entry unit delay A133 and inverter A154 being now "on," it enters to arrive at the first input lead 67 of the adding circuit ADR1 two digit intervals late on standard time. If the M digits specified an active modifier word this is also supplied to the other input lead 68 of the adding circuit ADR1 at the same time. As this feature forms the subject of our copending application Ser. No. 560,829, filed January 23, 1956, now abandoned, (hereinafter called application B) it will not be further described herein. The output of the adding circuit ADR1, which is an order word pair containing both A and B orders, then proceeds to flow down the control line of unit delays A24 . . . A48 to provide the various control line outputs I0 . . . I17. It also flows from unit delay A28 through the 35 interval delay line A14 and thence direct to the lower entry gate of double-entry unit delay A21, arriving at the latter exactly one beat time later. The U15 waveform controlling the input to delay line A01 has by this time gone "off" owing to the cessation by that time of the D beat of the C period. It will be noted that if the output from the adder ARD1 is three intervals late on standard time the head of the order word signal will not reach the output of the delay line A14 until a further 40 intervals later, i.e. in digit interval time 1 of the next beat.

The initial half of the order word, which contains the B order, is lost from the control instruction line as the return path to double-entry gated delay A41 is blocked by the X19 waveform being "off" and at the digit interval time 40 of the D beat of the C period only the A order portion of the order word will be in the control instruction line delays A24 . . . A48.

At this 40 digit interval time, the N-digit staticisors shown in FIG. 5 are reset by the opening of their respective regenerative loops and are immediately reset in accordance with the form of the I0 and I3 outputs which are fed thereto from the control instruction line. This operation is similar to that which occurred at the end of the previous E beat of the B period except that the N-digit staticisors are now se up in accordance with the N-digits of the A order of the selected order word. At the 41 digit interval time of this same beat, the X-digit staticisors constituted by the trigger circuits including double-entry gated delays D117, D118, D119 of FIG. 5 also become set up as the C waveform terminates at the end of digit interval time 40 and so allows the ∼C waveform to open the gate D106 to the 41 digit time pulse. The form of the S8, S9 and S10 and their respective inverse versions indicates the address number signalled by the X digits of the A order.

At the same 41 digit interval time and in similar manner gate U01 opens to allow the trigger circuits associated with the double-entry gated delays U21 . . . U27 of FIG. 5 to become set up according to the nature of the F digits of the A order in the control line whereby the various undecoded outputs of F0, F1 . . . F5 waveforms and their inverse versions and the G00 . . . G07 and G10 . . . G17 outputs take on a character which is dependent upon the form of order signalled by the F digits. A little previously at the 24 and 25 digit times of the same D beat of the C period the M-digit staticisors, constituted by the trigger circuits including double-enry gated delays D167, D168 and D169, likewise become set up according to the nature of the M digits of the order.

It will be noted that whereas the N-digit staticisors, the X-digit staticisors and the M-digit staticisors remain set for only one beat period or less (the M-digit staticisors are set up only from the 24 or 25 digit interval time to the following 39 digit interval time) the F-digit staticisors remain set up continuously until the 39 digit interval time of the next following E beat which is the last beat of the time taken to complete an order.

The setting of the N-digit staticisors will cause one of the gates such as S17, S13, S11, Q70, Y58 or Y302 controlling the different registers or one of the unit delays V6, V7 or H50 controlling the sources of constants or the like of the high-speed computing store 10 to provide an "on" output and so permit the word signal therein to flow out through the associated gate, such as S77, S71, S72, Q80, Y96 or Y332, to the bus bar Y40. This word signal proceeds to the computing unit 5 either directly over bus Y40 if the function digit combination is such that the G07 and G13 waveforms are active (order 73) or by way of the double-entry unit delay V54 and the bus Y41. The trigger circuit around delay V54 operates to copy the last or sign digit of a number once (into digit position 40) during the passage of the signal therethrough.

In similar manner the setting of the X-digit staticisors which provide the S8, S9 and S10 waveforms and their inverse versions serve to set up an output path from one of the output gates S57, S53, S51 . . . Q81 of one of the group of accumulator registers 2 through the further double-entry gated delay V36 to the bus bar Y44, passing en-route through the double-entry gated delay V57 which operates in a manner similar to the delay V54 to copy the last digit of the number signal. This signal likewise proceeds to the computing unit 5.

In the computing unit the manner of operation of the computing circuit CPC and its associated elements is determined, as already explained, by the character of the F digits of the order while the order of application of the two N and X numbers to the first and second inputs 64, 65 of the computing circuit, i.e. whether the N number is to go to the second input and the X number to the first input or vice versa, is similarly determined by the character of the F digits of the order by virtue of the form of the various G and F waveforms. At the input of the computing circuit the two numbers are each 4 digit intervals late on standard time and as the computing circuit itself imposes an additional unit delay the result-representing signal at the output 66 of the computing circuit CPC passes through the 35-interval delay B55 and further unit delay B56 to emerge on output bus bar Y2, 41 digits late on standard time. This result signal proceeds over bus bar Y2 back to the high-speed computing store where it enters through unit delay V51 to the input bus Y35 of the store. This brings the number back to standard time and the instant of arrival of its least significant digit coincides with the digit interval 0 of the next following beat E of the A period.

The beat counter is stepped on at the end of digit interval 40 of the D beat of the A period as already explained and in the same 40 digit interval the N-digit staticisors become reset. The X-digit staticisors become reset two intervals earlier at 38 digit interval time but the F-digit staticisors remain set as already explained.

In the meantime, the order word signal circulating through delay line A14 and delay A21, FIG. 4, has re-entered the control instruction line of delays A24, A25 . . . A28 one beat time later. The N-digit staticisors now become set up again to determine the destination of the result signal arriving from the computing unit 5 but the manner in which they are set up is determined by the character of the particular order being obeyed and hence is dependent upon the form of the F digits.

Referring to the N staticisors shown in FIG. 5 it will be seen that whereas the I0 output from the control instruction line alone is applied to the four staticisors dealing with the most significant N digits *n*3 . . . *n*6, the three staticisors comprising delays D46, D47, D49 which deal with the three least significant digits *n*0 . . . *n*2 of the N digit group may be controlled through delay D35 either by the I3 output or by the I6 output of such control instruction line dependent upon whether the X42 or the X43 waveform is "on." These latter waveforms are derived respectively from the unit delay D122 and the inverter D133, FIG. 5. The delay D122 will always be provided with an input whilst the function staticisors are set up in accordance with order 23. The same delay D122 will also be provided with an input in any beat except the D beat in the A or B periods and even then will be provided with an input if the function digits F signal any order of the group 10 . . . 17. In consequence the X42 waveform is "on" and the X43 waveform is "off" for these particular orders or conditions. At all other times the X42 waveform will be "off" and the X43 waveform will be "on."

Assuming first that the order being signalled is one in the group 00 . . . 07, i.e. in which the result signal from the computing unit 5 is to be fed back into the accumulator block of registers originally signalled by the X digits of the order, then there will be no input to gate D122 and waveform X43 will be "on." As a result the I6 waveform from the control line will be fed to the double-entry unit delay D35, FIG. 5, and so to the three staticisors associated with the delays D46, D47 and D49. As the X42 waveform is "off" there will be no input to the other four more significant N-digit staticisors. The signals coincident with digit interval time 40 in the I6 output from the control instruction line coincide with the three X digits of the A order whereby the three N-digit staticisors formed around delays D46, D47, D49 now become set up to signal the original X-digit address number. This causes the appropriate one of the relevant register control gates S17, S13, S11 . . . Q70, FIG. 6, to be opened whereby the result-representing signal on the input bus bar Y35 flows into such accumulator register, the previous content of this register being automatically erased at the same time by the blocking of its regeneration loop through the associated inverter, such as S27 of register 1.

If, however, the particular F digit combination of the order had been one in the group 10 . . . 17 or the order 23, the gate D122, FIG. 5, would have received an input and the X42 waveform would have been "on" and the X43 waveform "off." In consequence of this, the other signal entry gate of the double-entry unit delay D35 would be open to allow entry of the I3 output from the control instruction line and the gate D30 and unit delay D31 similarly open to allow the entry of the 10 output from such control instruction line. In a manner similar to that already described, the N-digit staticisors then become set up once again in accordance with the configuration of the N digits of the existing order and the appropriate one of the control gates of any of the registers or destinations contained in the high-speed computing store 10 becomes available for the reception of the incoming result-representing signal on bus bar Y35.

At digit interval time 20 of the E beat of the A period, the X21 waveform goes "off" and the X19 waveform comes "on" due to the operation of the elements A170, A171, A182, FIG. 4. This causes entry gate A21, FIG. 4, to close and entry gate A41 to open whereby the B order word, which is at that instant in the line of unit delays A24 . . . A48, flows directly back into such line again and becomes located therein in register with the timings previously applicable to an A order, i.e. in positions corresponding to digits 19–37.

The beat counter operates at the end of the E beat to change to the D beat of the B period whereafter a cycle of operations similar to those of an A period takes place using, however, the N, X, M and F digits of the B order.

Thereafter a new order word is selected as already described and the whole cycle repeated.

The above described arrangements by which one operand signal may be drawn from any selected one of the addresses in the whole of the computing store 10 and another operand signal may be drawn from any selected one of the addresses in a restricted part, i.e. the accumulator register group 2, of such computing store and by which the result signal may be returned to either of such addresses under the control of a single order and within a two-beat period of the machine rhythm provides an advantageous increase of overall operating speed for the machine and the performance of an increased number of useful arithmetical and logical operations within the machine in a simple manner.

Elementary arithmetical or logical operations may be carried out directly upon the content of any store address including addition, subtraction, collation, not-equivalent-to, reverse subtraction and replace negatively. For example, order 03 ($x'=-n+x$) provides for the subtraction of a number in a specified register from the number already in a specified accumulator register, the answer being left in such accumulator register. Order 04, on the other hand, provides for the subtraction of the number in the specified accumulator register from the number within the specified other register, the answer still being left in such accumulator register. Orders 13 and 14 are similar but with the answers left in the specified register instead of the specified accumulator register. Orders 04 and 14 can be used to replace any existing number in a specified accumulator register or other register by its negative equivalent or complement by specifying the other register or accumulator $n$ or $x$, as the case may be, as the register address number 0. As already explained, this can neither provide nor receive signals and can, in consequence, be regarded both as a source of signal value zero and as an erasing medium.

We claim:

1. An electronic digital computer arranged for operation in the serial mode and with order signals which comprise separate first and second address-defining digit groups and which includes a first group of single word storage registers each of the immediate access type, each of said first group registers having a signal input including switching means controlled by a first address selection signal unique to that register, a first signal output including switching means also controlled by the same unique first address selection signal and a second signal output including switching means controlled by a second address selection signal unique to that register, a second group of single word storage registers each of the immediate access type and each including a signal input including switching means controlled by a first address selection signal unique to that register and a signal output including switching means also controlled by the same first address selection control signal unique to that register, a computing unit having first and second operand-signal inputs and a result-signal output, a control system including a circulating storage register for an applied order signal and first and second address signal staticisor means for providing the currently operative unique forms of said first and second address selection signals, a first signal transfer circuit connecting said result-signal output of said computing unit to the signal inputs of each of said first and second group registers, a second signal transfer circuit connecting the first operand-signal input of said computing unit to the first signal output of said first group registers and to said signal output of said second group registers, a third signal transfer circuit connecting said second operand-signal input of said computing unit to said second signal output of said first group registers and means including result-signal destination selector switch means in said control system for initially applying said order signal to said first and second address signal staticisor means whereby the operative unique forms of said first and second address selection signals are initially determined respectively by said first and second address-defining digit groups of said order signal and for subsequently re-applying said order signal from said circulating storage register only to said first address signal staticisor means through said result-signal destination selector switch means whereby the operative unique form of said first address selection signal is subsequently determined either by the digit configuration of said first address defining digit group or said second address defining digit group of said order signal in accordance with the setting of said result-signal destination selector switch means.

2. An electronic digital computer arranged for operation in the serial mode and with order signals which comprise separate first and second address-defining digit groups and a function defining digit group and which includes a first group of single word storage registers each of the immediate access type, each of said first group registers having a signal input including switching means controlled by a first address selection signal unique to that register, a first signal output including switching means also controlled by the same unique first address selection signal and a second signal output including switching means controlled by a second address selection signal unique to that register, a second group of single word storage registers each of the immediate access type and each including a signal input including switching means controlled by a first address selection signal unique to that register and a signal output including switching means also controlled by the same first address selection control signal unique to that register, a computing unit having first and second operand-signal inputs and a result-signal output, a control system including a circulating storage register for an applied order signal, first and second address signal staticisor means for providing the currently operative unique forms of said first and second address selection signals and function-signal staticisor means for providing function control signals, a first signal transfer circuit connecting said result-signal output of said computing unit to the signal inputs of each of said first and second group registers, a second signal transfer circuit connecting the first operand-signal input of said computing unit to the first signal output of said first group registers and to said signal output of said second group registers, a third signal transfer circuit connecting said second operand signal input of said computing unit to said second signal output of said first group registers and means in said control system including a signal-controlled selector switch means controlled by the currently available function control signal for initially applying said order signal to said first and second address signal and said function signal staticisor means whereby said function signal staticisor means provide a function signal output and the currently operative unique forms of said first and second address selection signals are initially determined respectively by said first and second address-defining digit groups of said order signal and for subsequently re-applying said order signal from said circulating storage register only to said first address signal staticisor means through said signal controlled selector switch means whereby the operative unique forms of said first address selection signal is subsequently determined by the digit configuration of a chosen one of said first and second address-defining digit groups of said order signal as determined by said function signal.

3. An electronic digital computer arranged for operation in the serial mode and with order signals which comprise separate first and second address-defining digit groups and a function-defining digit group and which includes a group of single word storage registers each of the immediate access type, each of said registers having a signal input including switching means controlled by a first address selection signal unique to that register, a first signal output including switching means also controlled by the same unique first address selection signal and second signal output means including switching means controlled by a second address selection signal unique to that register, a computing unit having first and second operand-signal inputs and a result-signal output, a control system including a circulating storage register for an applied order signal, first and second digit signal staticisor means providing the currently operative unique forms of said first and second address selection control signals and function-signal staticisor means providing a function control signal, a first signal transfer circuit connecting said result-signal output of said computing unit to the signal inputs of each of said registers, a second signal transfer circuit connecting the first operand-signal input of said computing unit to the first signal output of each of said registers, a third signal transfer circuit connecting said second operand-signal input of said computing unit to said second signal output of each of said registers, means in said control system for initially applying said order signal to said first and second address signal and said function signal staticisor means whereby said function signal staticisor means provide a function control signal determined by said function digits of said order signal and the operative unique forms of said first and second address selection signals are initially determined respectively by said first and second address-defining digit groups of said order signal and further means including selector switch means controlled by said function signal for resetting each of said address signal staticisor means to zero and subsequently re-applying said order signal from said circulating storage register only to said first digit staticisor means whereby the currently operative unique form of said first address selection signal is subsequently determined by the digit configuration of a chosen one of said first and second address-defining digit groups of said order signal.

4. An electronic digital computing machine arranged for operation with order signals comprising separate first and second address-defining sections and a function-defining section, said machine including a control system comprising means for providing first and second address selection signals each of unique form identifying respectively first and second address locations defined by said first and second address signal sections and an operative order function signal determined by said function-defining section, a plurality of single word storage registers each having a signal input provided with address signal controlled switch means responsive to a unique form of address signal and alternative first and second signal outputs also provided with separate address signal controlled output switch means responsive respectively to unique forms of address signals, a computing unit having first and second operand-signal inputs connected respectively to the first and second signal outputs of each of said registers and a result-signal output connected to said signal input of each of said registers, first and second address signal staticisor means providing the currently operative unique forms of said first and second address selection signals and order function signal staticisor means providing a function control signal, means in said control system for initially applying an order signal to said first and second address signal and said function signal staticisor means whereby said function signal staticisor means provide a function control signal determined by the function-defining section of said order signal and the operative unique forms of said first and second address selection signals are initially determined respectively by the first and second address-defining sections of said order signal, further means including selector switch means controlled by said function control signal for resetting each of said address signal staticisor means to zero and subsequently reapplying said order signal only to said first address signal staticisor means whereby the currently operative form of said first address selection signal is subsequently determined by a chosen one of said first and second address-defining sections of said order signal, and sequence control means in said control system for simultaneously applying said first and second address selection signals respectively to said output switch means of said first and second signal outputs of said registers to render operative that first signal output and that second signal output which is responsive to said first and second address selection signals and for subsequently applying said chosen one of said first and second address selection signals to said switch means of said signal inputs of said registers to render operative that signal input which is responsive to the applied first or second address selection signal.

5. An electronic digital computing machine arranged for operation with order signals having separate digit groups for defining first and second storage location addresses, a control system which includes first and second address signal staticisor means for providing first and second address selection signals and sequence control means for initially applying a currently operative order signal to each of said staticisor means whereby said first and second address selection signals initially define respectively said first and second address locations and further means including selector switch means for resetting each of said address signal staticisor means to zero and subsequently reapplying said currently operative order signal only to said first address signal staticisor means whereby the currently operative form of said first address selection signal is subsequently determined by the digit configuration of a chosen one of the address-defining digit groups of said order signal.

6. An electronic digital computing machine arranged for operation with serial mode word signals and with a multi-beat-to-the-bar rhythm under the control of order signals which each include separate first and second address-defining digit groups, said machine comprising a computing unit having first and second operand-signal inputs and a result-signal output, a plurality of single word storage registers each provided with a signal input and a singal output, a control system including rhythm control means for defining the successive beats of each operative bar, address selection signal generating means for providing separate first and second address selection signals defining the addresses identified by said first and second address digit groups of an order signal applied thereto and result-destination switching means controlled by said applied order signal, first switching means controlled by said first address selection signal and said rhythm control means for connecting that one of said register outputs which is identified by said first address selection signal to one of said computing unit inputs during a predetermined beat of the operative bar time of the machine rhythm, second switching means controlled by said second address selection signal and said rhythm control means for connecting the signal output of that one of said registers which is identified by said second address selection signal to the second signal input of said computing unit during the same predetermined beat of the machine rhythm and third switching means controlled by said rhythm control means and that one of said first and second address selection signals which is chosen by the operation of said result-selection switch means for connecting the result-signal output of said computing unit to the signal input of that one of said registers which is identified by said chosen first or second address selection signal during a subsequent beat of the same operative bar time of the machine rhythm.

7. An electronic digital computing machine according to claim 6 in which said applied order signals each include a function-defining digit group and in which said result-destination switching means are controlled by said function-defining digit signals.

8. An electronic digital computing machine according to claim 6 which includes at least one further signal source in addition to said plurality of single word storage registers, said source having a signal output connected for selection by said first switching means under the control of said first address selection signal.

9. An electronic digital computing machine according to claim 8 in which said further signal source comprises a source of signals representing a constant number value.

10. An electronic digital computing machine according to claim 6 in which said computing unit includes a computing circuit having first and second input terminals and order signal-controlled reversing switch means for connecting said first and second operand-signal inputs either to said first and second input terminals respectively or to said second and first input terminals respectively in accordance with the form of said order signal.

11. An electronic digital computing machine according to claim 10 in which said order signals include a function-defining digit signal group and in which said control system includes control signal generating means for providing a switch control signal to control said reversing switch means in accordance with the function digit configuration of said order signal.

References Cited in the file of this patent

UNITED STATES PATENTS

| | | |
|---|---|---|
| 2,737,342 | Nelson | Mar. 6, 1956 |
| 2,799,449 | Turing | July 16, 1957 |
| 2,800,277 | Williams | July 23, 1957 |
| 2,855,146 | Henning et al. | Oct. 7, 1958 |

FOREIGN PATENTS

| | | |
|---|---|---|
| 1,084,187 | France | June 30, 1954 |

OTHER REFERENCES

Auerbach et al., Proceedings of the I.R.E., vol. 37, August 1949, pp. 855–861.

"System Organization of the Dyseac," National Bureau of Standards Report No. 2893, August 1953, pp. 12, 13, 30 and FIG. 1 relied on.